(12) United States Patent
Jain et al.

(10) Patent No.: US 9,965,764 B2
(45) Date of Patent: May 8, 2018

(54) METHODS OF PROCESSING AND SEGMENTING WEB USAGE INFORMATION

(75) Inventors: Ankur Jain, Cupertino, CA (US); Abhinay Gupta, Menlo Park, CA (US); George H. John, Redwood City, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1431 days.

(21) Appl. No.: 11/752,831

(22) Filed: May 23, 2007

(65) Prior Publication Data

US 2008/0294495 A1    Nov. 27, 2008

(51) Int. Cl.
G06Q 90/00     (2006.01)
G06Q 30/02     (2012.01)

(52) U.S. Cl.
CPC ......... *G06Q 30/02* (2013.01); *G06Q 30/0201* (2013.01)

(58) Field of Classification Search
USPC ........................................................ 705/10
See application file for complete search history.

(56) References Cited

U.S. PATENT DOCUMENTS

| | | | | |
|---|---|---|---|---|
| 5,926,794 A | * | 7/1999 | Fethe | 705/11 |
| 6,661,431 B1 | * | 12/2003 | Stuart et al. | 715/733 |
| 6,768,972 B1 | * | 7/2004 | Schaffler et al. | 702/189 |
| 7,158,866 B2 | * | 1/2007 | Gustafsson et al. | 701/1 |
| 2002/0082910 A1 | * | 6/2002 | Kontogouris | 705/14 |
| 2005/0096758 A1 | * | 5/2005 | Takezawa et al. | 700/44 |
| 2005/0234753 A1 | * | 10/2005 | Pinto et al. | 705/7 |
| 2006/0020596 A1 | * | 1/2006 | Liu et al. | 707/6 |
| 2007/0033531 A1 | * | 2/2007 | Marsh | 715/738 |
| 2007/0270101 A1 | * | 11/2007 | Mourad | 455/67.11 |
| 2008/0162206 A1 | * | 7/2008 | Mak et al. | 705/7 |
| 2009/0150238 A1 | * | 6/2009 | Marsh et al. | 705/14 |

* cited by examiner

*Primary Examiner* — Leland Marcus
(74) *Attorney, Agent, or Firm* — James J. DeCarlo; Greenberg Traurig, LLP (57) ABSTRACT

A current behavioral targeting system is first tested using a suite of test data. The output of the test is one or more performance metrics. Next, newly proposed behavioral targeting system created. The newly proposed behavioral targeting system is then evaluated using both the existing source data and a new source data. The evaluation of the newly proposed behavioral targeting system produces one or more performance metrics of the same type earlier calculated. Finally, the two sets of performance metrics are compared. The performance metric difference represents the impact of the new source data.

16 Claims, 4 Drawing Sheets

METHODS OF PROCESSING AND SEGMENTING WEB USAGE INFORMATION

FIELD OF THE INVENTION

The present invention relates to the field of marketing data analysis. In particular the present invention discloses techniques for analyzing and valuing marketing information.

BACKGROUND OF THE INVENTION

The global Internet has become a mass media on par with radio and television. And just like radio and television content, the content on the Internet is largely supported by advertising dollars. The main advertising supported portion of the Internet is the "World Wide Web" that displays HyperText Mark-Up Language (HTML) documents distributed using the HyperText Transport Protocol (HTTP).

Two of the most common types of advertisements on the World Wide Web portion of the Internet are banner advertisements and text link advertisements. Banner advertisements are generally images or animations that are displayed within an Internet web page. Text link advertisements are generally short segments of text that are linked to the advertiser's web site.

With any advertising-supported business model, there needs to be some metrics for assigning monetary value to the advertising. Radio stations and television stations use ratings services that assess how many people are listening to a particular radio program or watching a particular television program in order to assign a monetary value to advertising on that particular program. Radio and television programs with more listeners or watchers are assigned larger monetary values for advertising. With Internet banner type advertisements, a similar metric may be used. For example, the metric may be the number of times that a particular Internet banner advertisement is displayed to people browsing various web sites.

In contrast to traditional mass media, the internet allows for interactivity between the media publisher and the media consumer. Thus, when an internet advertisement is displayed to a web viewer, the internet advertisement may include a link that directs where the web viewer may obtain additional information. Thus, a web viewer may 'click' on an internet advertisement and be directed to a web site that contains more information on the advertised product or service. When a web viewer selects an advertisement, this is known as a 'click through' since the web viewer 'clicks through' the advertisement to see the advertiser's web site.

A click-through clearly has value to the advertiser since an interested web viewer has indicated a desire to see the advertiser's web site. Thus, an entity wishing to advertise on the internet may wish to pay for such click-through events instead of paying for displayed internet advertisements. Internet advertising services have therefore started offering internet advertising on a pay-per-click basis wherein advertisers pay for a certain number of web viewers that click on advertisements.

To maximize the advertising fees that may be charged, internet advertising services must therefore display advertisements that are most likely to capture the interest of the web viewer. One method of achieving this goal is to display an advertisement the closely matches the type of information presented in the web pages viewed by web viewers. Another method of displaying advertisements likely to appeal to the web viewer is to use any demographic information known about the web viewer in order to select advertisements that are most desired by the demographic of the web viewer.

There are many potential methods of selecting advertisements in order to maximize the probability of having a web viewer select the advertisement. Many of these methods involve using information in order to better select an advertisement for the web viewer. Thus, it would be desirable to be able to rate sources of information in order to determine what information should be used to select advertisements.

SUMMARY OF THE INVENTION

The present invention introduces methods for evaluating and using behavioral targeting source data. Initially, a current behavioral targeting system is tested using a suite of test data. The output of the test is one or more performance metrics. Next, a scaled-down version of a newly proposed behavioral targeting system created. The newly proposed system is then evaluated using both the existing source data and a new source data. The evaluation of the newly proposed behavioral targeting system produces one or more performance metrics of the same type earlier calculated. Finally, the two sets of performance metrics are compared. The difference between the performance metrics of the newly proposed system and the old system represent the impact of the new source data.

Other objects, features, and advantages of present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION

Methods for evaluating and using behavioral targeting source data are disclosed. In the following description, for purposes of explanation, specific nomenclature is set forth to provide a thorough understanding of the present invention. However, it will be apparent to one skilled in the art that these specific details are not required in order to practice the present invention. Furthermore, although the present invention is mainly described with reference to web viewer information gathered using the World Wide Web and the HyperText Transport Protocol (HTTP), the same techniques can easily be applied to other types of information.

Advertising Support for Commercial World Wide Web Sites

The World Wide Web portion of the global Internet has become a mass media that largely operates using advertiser sponsored web sites. Specifically, web site publishers provide interesting content that attracts web site viewers and the publisher intersperses paid advertisements into the web pages of the web site. The fees from the advertisers compensate the web site publisher for creating the interesting content that attracts the web viewers.

Some internet web site advertisements are 'banner advertisements' consisting of an advertiser-supplied image or animation. Other internet web site advertisements merely consist of simple short strings of text. However, one thing that most internet web site advertisements have in common is that the internet web site advertisements contain a hyperlink (link) to another web site such that the person viewing the internet advertisement may click on the advertisement to be directed to the advertiser's web site to obtain more information.

Figure 1:
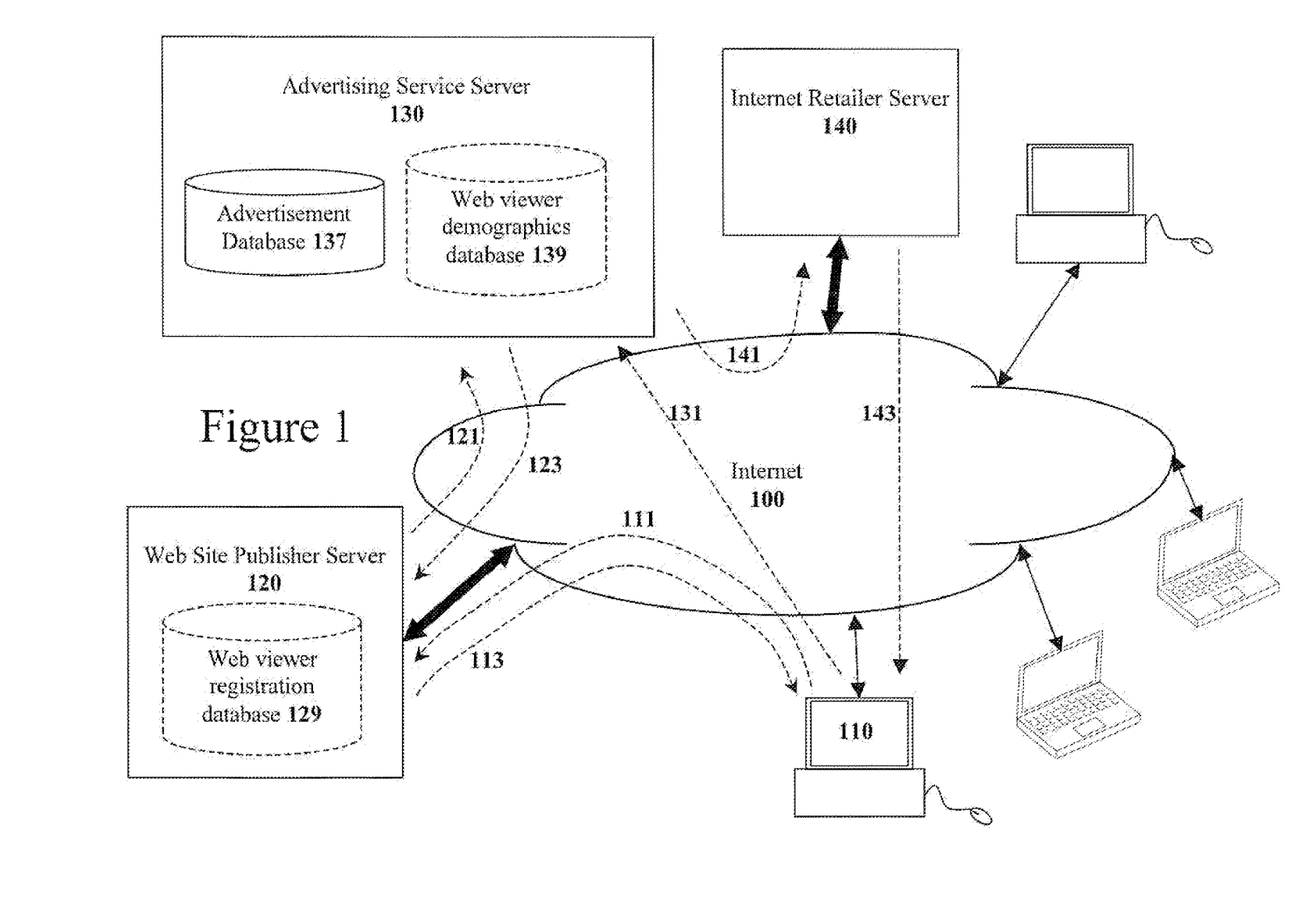
FIG. 1 illustrates a conceptual diagram of a personal computer accessing a web site server on the Internet that is supported by an advertising service.

The advertisements within an advertisement supported web site are generally provided to a web site publisher by an internet advertising service. FIG. 1 illustrates conceptual diagram of how an internet advertising service and a web site publisher operate.

Referring to FIG. 1, an internet-based retailer server 140 that sells products to internet-based customers may sign up with an internet advertisement service 130 in order to promote the web site of the internet based retailer. When an internet user at personal computer 110 is browsing a web site published by web site publisher server 120, the internet user may be exposed to an advertisement from internet advertisement service 130 that advertises the offerings of the internet retailer 140.

If the internet user at personal computer 110 is sufficiently interested in the advertisement, the internet user may click on the advertisement such that the user will be re-directed to the internet retailer server 140. That internet user will be re-directed to the internet retailer server 140 through an advertising service server 130 that will record the user's selection of the advertisement in order to bill the advertiser for the selection of the advertisement. Once the internet user has been re-directed to the internet retailer server 140, the user at personal computer 110 may purchase goods or services directly from the internet retailer server 140.

Behavioral Targeting of Advertisements

Referring to the Internet advertising example of FIG. 1, the internet retailer 140 obtains the most benefit from internet-based advertisements when an internet user clicks on the internet advertisement and visits the Internet Retailer web site 140. Thus, the internet retailer would ideally only like to pay for advertisements when web viewers click on the advertisements. In response, many internet advertising services have begun to offer advertising services on such a "pay-per-click" basis.

In order to maximize the advertising revenue, the advertising service 130 needs to select internet advertisements from and advertisement database 137 that will most appeal to the web viewers. This will increase the probability of an advertisement selection that will result in income. One method of selecting an internet advertisement may be to examine the contents of the web page that the internet user at personal computer 110 selected and attempt to select an advertisement that closely complements the web page selected by the user. This technique is generally known as "Behavioral Targeting" since the internet user is being targeted based upon the internet user's behavior (the internet user's web page selection behavior, in this example). There are many other methods of performing such behavioral targeting in order to select an internet advertisement.

Evaluating Potential Behavioral Targeting Data

Most of the methods of performing behavioral targeting involve the use of some data known about an internet user (or internet users in general) that is analyzed and used to make an internet advertisement selection. The quality of the data known about internet users or particular users will vary significantly. If the known data results in improved advertisement selection as proven by some performance metric then that data is judged to be high-quality data. For example, if the known data can be used to select advertisements that result in a higher advertisement click rate, that data is judged to be high quality data for behavioral targeting.

In order to build improved behavior targeting systems, it is very desirable to determine what type of source data is such high-quality data. Furthermore, it would be very desirable to assign an actual numerical rating to the source data in order to have a quantifiable metric. In this manner, one could use this data quality metric as determination as to what source data types should be sought. Furthermore, if one is offered some source data, one may be able to judge a relative value of that source data.

The present invention introduces methods of calculating such a numerical quality rating for source data that may be used within a behavioral targeting system. Furthermore, the system of the present invention may be used to calculate an actual "monetary value" for a new data source with respect to a behavioral targeting system.

Figure 2:
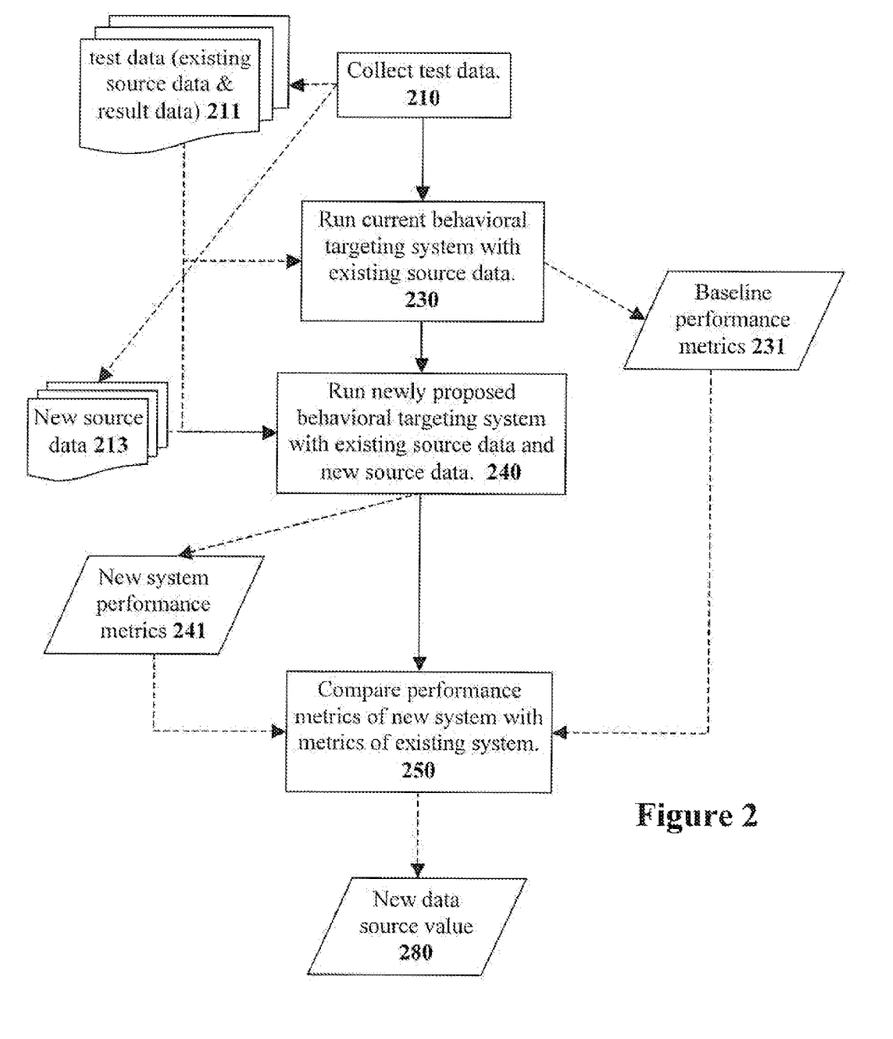
FIG. 2 illustrates a flow diagram that generally describes how the behavioral targeting data evaluation system of the present invention operates.

FIG. 2 illustrates a flow diagram of the overall method of the present invention. Initially, a set of test data is collected at step 210. The test data comprises the existing source data used to perform advertisement selections and the results of whether a particular internet advertisement was selected by an internet user or not. An example of existing source data that may be used includes: the web page viewing habits of users, the geographic location of users, the advertisement viewing habits of users, etc. The result data may be whether an internet user clicked on a selected advertisement, the amount of time spent at an advertiser's web site after a click, whether the user added an item to a shopping cart, whether the user purchased an item from the advertiser's web site, whether the user registered with etc. All of this collected source data and associated result data is collectively referred to as the test data 211.

In addition to the existing source data, new source data and its associated result data 213 is also collected. The new source data 213 is data that is not yet being used in an existing behavioral targeting system for selecting advertisements. For example, the new source data 213 may be a history of recent searches made by web viewers tracked in the existing source data.

After collecting all the needed test data, the next step (step 230) is to evaluate a baseline behavioral targeting system using the test data 211. This baseline behavioral targeting system may currently be used in production. Alternatively, the baseline behavioral targeting system may be a system constructed just to be used as a reference system. For example, a machine learning system maybe used to create a reference baseline behavioral targeting system. The output of the evaluation of the baseline behavioral targeting system is one or more performance metric 231.

In the context of an advertisement selection system as illustrated in the block diagram of FIG. 1, one very important performance metric is the advertisement click rate.

Other metrics could include the likelihood of web user becoming a loyal user, the likelihood of a web user migrating to a related web service, etc. Since the current behavioral targeting system is being tested, that performance metric represents a baseline performance metric. One example of a performance metric that may be calculated is an advertisement click rate, the percentage of times that the current behavioral targeting system selects an advertisement that the web viewer clicks on.

Next, at step 240, a newly proposed behavioral targeting system is evaluated using both the existing source data and the new source data 213. The newly proposed behavioral targeting system may be constructed using some modeling framework that is then tuned for the combined source data (existing source data plus the new source data source). This initial model will likely not be optimal but should be good enough to provide sufficient results. This initial model can easily be constructed using a machine learning system that builds a model when given sufficient learning data. As in the evaluation of the first behavioral targeting system in step 230, the evaluation of the newly proposed behavioral targeting system n step 240 produces one or more performance metrics 241 for the new system. The calculated performance metrics are of the same type calculated in step 230.

Finally, at step 250, the baseline performance metrics 231 of the first behavioral targeting system and the performance metrics 241 of the newly proposed behavioral targeting system are compared. The difference of these performance metrics represents the relatively impact of the new source data. The larger the difference, the more valuable that new source data.

Machine Learning for Evaluating Behavioral Targeting Data

As set forth in FIG. 2, one of the more difficult aspects is the incorporation of the new data source into the existing behavioral targeting system. One method of constructing a test model is to use machine learning systems.

Figure 3:
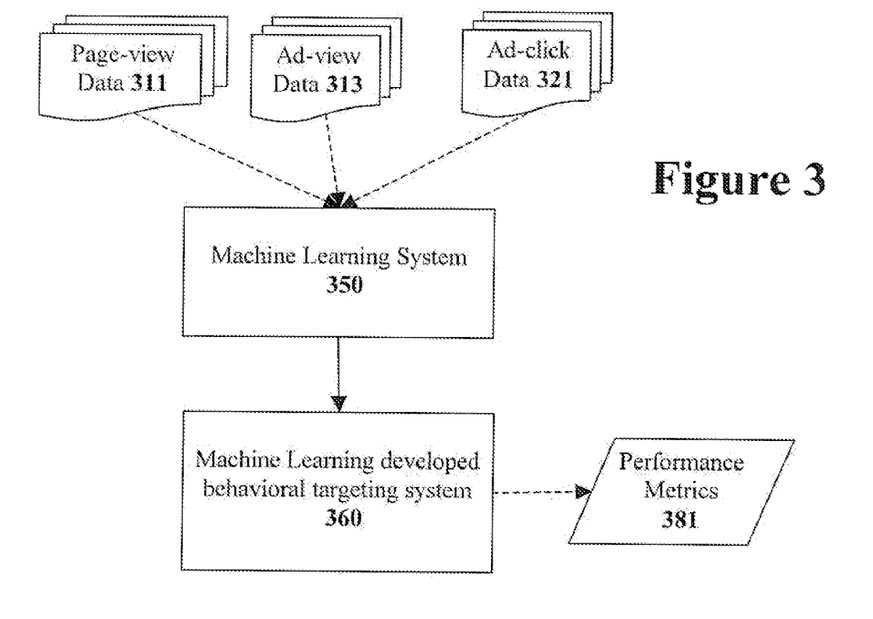
FIG. 3 illustrates a flow diagram that generally describes how a machine learning system can be used to create a baseline behavioral targeting system.

FIG. 3 illustrates how a machine learning system can first be used to build a baseline behavioral marketing system. Specifically, vectors of page-view data 311 and ad-view source data 413 along with ad-click result data 421 are fed into a machine learning system 350. Upon learning from a sufficient amount of data, a machine learning constructed behavior targeting system 360 will be created. Large amounts of test data may be fed through the machine-learning based behavioral targeting system to generate a set of baseline performance metrics 381.

Figure 4:
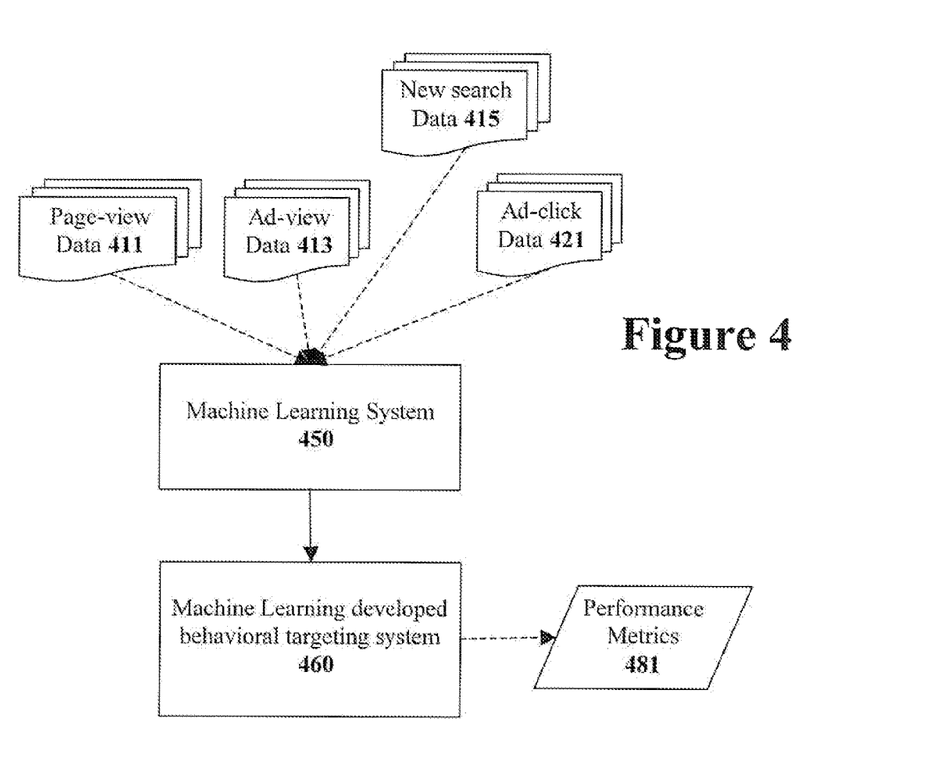
FIG. 4 illustrates a flow diagram that generally describes how a machine learning system can be used to create a test behavioral targeting system for evaluating a new data source.

Next, the machine learning system is used to construct a behavioral targeting system that incorporates the new source data. FIG. 4 illustrates vectors of page-view source data 411, ad-view source data 413, and new search source data 415; along with ad-click result data 421 fed into a machine learning system 450. The resulting output is a machine-learning developer behavioral targeting system 460 that incorporates the new source data. The machine-learning developed behavioral targeting system 460 is then tested with a large amount of test data to generate a set of performance metrics 481. The performance metrics 481 of the behavioral targeting system with the additional source data 415 are compared with the performance metrics 381 of the original system. The difference in the performance metrics will give an indication of the value of the new source data.

Note that if the same machine learning system is used to create both the baseline behavioral targeting system and the newly proposed behavioral targeting system, then there should be little bias introduced by having different behavioral targeting systems.

Allocating Behavioral Targeting Development

The behavioral targeting data valuation system of the present invention allows the developers of behavioral targeting systems to better allocate their development efforts. Specifically, various different data sources for behavioral targeting may be analyzed using the behavioral targeting data valuation system of the present invention in order to determine the relative value of the different data sources. The behavioral targeting system developer may then allocate development resources towards those data sources that provide the best return.

Valuing Potential Behavioral Targeting Data Sources

In addition to prioritizing behavioral targeting system development, the behavioral targeting data valuation system of the present invention allows for monetary values to be assigned to behavioral targeting data sources. Referring back to FIG. 2, the final step is to compare the performance metrics of the existing behavioral targeting system to the performance metrics of the new behavioral targeting system. One may calculate a simple percentage improvement of the new behavioral targeting system. This percentage improvement may be used to calculate the value added by the new data. For example, if the existing behavioral targeting system generates $1 million of revenue per year and the new behavioral targeting system provides a 3% performance increase, then the value of the new behavioral targeting system along with the new data source is 3% of $1 million or $30,000 per year.

The valuation of the new data source can is of prime importance when negotiating with an external partner that may provide source data for behavioral targeting system. Referring to the example of the previous paragraph, one would know to offer no more than $30,000 for access to the data source. Otherwise, the deal would be a money losing proposition. In the same manner, the valuation of behavior targeting data may be used to assign credit to an internal partner that will provide source data.

The behavioral targeting data valuation system may also be used to create revenue sharing arrangements. Referring again to the previous example, credit may be assigned to the partner in the form of a percentage of derived revenues. Thus, with source data that is proven to increase performance by 3%, the entity performing the behavioral targeting may offer the source data provider 1% of the advertising revenue.

Behavioral Targeting Premium

Detailed source information is generally not available for all of the users of any publicly available internet service. For example, referring to FIG. 1, some users of a web site offered by web site publisher server 120 will register with the web site and other users will not. Those web users that do register will have demographic information collected in the web viewer registration database 129. Generally, a behavioral targeting system will provide better performance if it has access to the demographic information in the web viewer registration database 129.

Since the behavioral targeting ability performance of a behavioral targeting will be improved with access to the demographic information in the web viewer registration database 129, the advertising service 130 and web site publisher 120 may charge higher rates for advertising to registered web site users. And the data valuation system of the present invention allows the advertising service 130 and web site publisher 120 to determine how much that demographic information is worth. Thus, the data valuation system of the present invention can be used to determine how much of a premium can be charged to web site viewers that are registered users of the web site publisher server 120.

The foregoing has described a number of techniques for evaluating and using behavioral targeting source data. It is contemplated that changes and modifications may be made by one of ordinary skill in the art, to the materials and arrangements of elements of the present invention without departing from the scope of the invention.

We claim:

1. A method comprising:
   creating, by a processor, a baseline behavioral targeting system using a machine learning system comprising:
      retrieving a training data set comprising page view data, ad view data, and ad click data, and
      training the machine learning system using the training data set;
   calculating, by the processor, a baseline performance metric value for said baseline behavioral targeting system a test data set comprising:
      retrieving existing source data and existing result data, the existing source data comprising webpage viewing habits and demographic information of users, the existing result data comprising information for indicating whether a user has clicked on advertisements on at least one webpage that were selected by using the existing source data and an amount of time spent at an associated advertiser's web site after a click;
      inputting the existing source data into the baseline behavioral targeting system,
      calculating predicted result data using the baseline behavioral targeting system, and
      comparing the predicted result data to the existing result data to calculate the baseline performance metric value;
   creating, by the processor, a proposed behavioral targeting system using the machine learning system comprising:
      retrieving a proposed training data set comprising the training data set and new search data, and
      training the machine learning system using the proposed training data set;
   calculating, by the processor, a second performance metric value for said proposed behavioral targeting system comprising:
      retrieving the existing source data and the existing result data;
      inputting the existing source data into the proposed behavioral targeting system,
      calculating proposed predicted result data using the proposed behavioral targeting system, and
      comparing the proposed predicted result data to the existing result data to calculate the second performance metric value;
   determining, by the processor, a value of the new search data by comparing said second performance metric value to said baseline performance metric value, the value indicating whether the new search data improved the predicted result data of the proposed behavioral targeting system in comparison with the predicted result data of the baseline behavioral targeting system;
   when said second performance metric value is greater than said baseline performance metric value, using said new search data for selecting advertisements for display;
   when said baseline performance metric value is greater than said second performance metric value, using said existing source data for selecting advertisements for display; and
   displaying, by the processor, the selected advertisements on a webpage.

2. The method as set forth in claim 1 wherein determining a value of new search data comprises calculating a percentage increase of said second performance metric value over said baseline performance metric value.

3. The method as set forth in claim 2 wherein determining a value of said new search data further comprises multiplying said percentage increase of said second performance metric value over said baseline performance metric value by a monetary value of said baseline behavioral targeting system.

4. The method as set forth in claim 1 wherein said method further comprises:
   creating a third behavioral targeting system using said training data set and a third set of data;
   calculating a third performance metric value for said proposed behavioral targeting system using said training data set and said third set of data;
   determining a value of said third set of data by comparing said third performance metric value to said baseline performance metric value; and
   comparing said value of said third set of data to said value of said new search data.

5. The method as set forth in claim 4 wherein said method further comprises:
   allocating development resources dependent on said value of said new search data and said third sets of data.

6. A non-transitory computer-readable storage medium, said computer-readable storage medium comprising a set of instructions for evaluating behavioral targeting source data, said set of instructions implementing the steps of:
   creating a baseline behavioral targeting system using a machine learning system comprising:
      retrieving a training data set comprising page view data, ad view data, and ad click data, and
      training the machine learning system using the training data set;
   calculating a baseline performance metric value for said baseline behavioral targeting system comprising:
      retrieving existing source data and existing result data, the existing source data comprising webpage viewing habits and demographic information of users, the existing result data comprising information for indicating whether a user has clicked on advertisements on at least one webpage that were selected by using the existing source data and an amount of time spent at an associated advertiser's web site after a click;
      inputting the existing source data into the baseline behavioral targeting system,
      calculating predicted result data using the baseline behavioral targeting system, and
      comparing the predicted result data to the existing result data to calculate the baseline performance metric value;
   creating a proposed behavioral targeting system using the machine learning system comprising:

retrieving a proposed training data set comprising the training data set and new search data, and training the machine learning system using the proposed training data set;

calculating a second performance metric value for said proposed behavioral targeting system comprising:

retrieving the existing source data and the existing result data;

inputting the existing source data into the proposed behavioral targeting system, calculating proposed predicted result data using the proposed behavioral targeting system, and comparing the proposed predicted result data to the existing result data to calculate the second performance metric value;

determining a value of the new search data by comparing said second performance metric value to said baseline performance metric value, the value indicating whether the new search data improved the predicted result data of the proposed behavioral targeting system in comparison with the predicted result data of the baseline behavioral targeting system;

when said second performance metric value is greater than said baseline performance metric value, using said new search data to select a first new advertisement for display;

when said baseline performance metric value is greater than said second performance metric value, using said existing source data to select a second new advertisement for display;

displaying, by the processor, the selected advertisements on a webpage.

7. The non-transitory computer-readable storage medium as set forth in claim 6 wherein determining a value of said new search data comprises calculating a percentage increase of said second performance metric value over said baseline performance metric value.

8. The non-transitory computer-readable storage medium as set forth in claim 7 wherein determining a value of said new search data further comprises multiplying said percentage increase of said second performance metric value over said baseline performance metric value by a monetary value of said baseline behavioral targeting system.

9. The non-transitory computer-readable storage medium as set forth in claim 6 wherein performance metric values further comprises an amount of time that the user has spent on an advertiser web site after interacting with the advertisement selections.

10. The non-transitory computer-readable storage medium as set forth in claim 6 wherein said set of instructions further implement the steps of:

creating a third behavioral targeting system using said training data set and a third set of data;

calculating a third performance metric value for said proposed behavioral targeting system using said training data set and said third set of data;

determining a value of said additional third set of data by comparing said third performance metric value to said baseline performance metric value; and comparing said value of said third set of data to said value of said new search data.

11. The non-transitory computer-readable storage medium of evaluating behavioral targeting source data as set forth in claim 10 wherein said set of instructions further implement the steps of:

allocating development resources dependent on said value of said new search data and said third sets of data.

12. A method comprising:

creating, by a processor, a baseline behavioral targeting system using a machine learning system comprising:

retrieving a training data set comprising page view data, ad view data, and ad click data, and training the machine learning system using the training data set;

calculating, by a processor, a baseline performance metric value for said baseline behavioral targeting system comprising:

retrieving existing source data and existing result data, the existing source data comprising webpage viewing habits and demographic information of users, the existing result data comprising information for indicating whether a user has clicked on advertisements on at least one webpage that were selected by using the existing source data and an amount of time spent at an associated advertiser's web site after a click;

inputting the existing source data into the baseline behavioral targeting system, calculating predicted result data using the baseline behavioral targeting system, and comparing the predicted result data to the existing result data to calculate the baseline performance metric value;

creating, by the processor, a proposed behavioral targeting system using the machine learning system comprising:

retrieving a proposed training data set comprising the training data set and new source data, the new source data comprising additional webpage viewing habits of users, geographic location information, and additional demographic information of users, and training the machine learning system using the proposed training data set;

calculating, by the processor, a second performance metric value for said proposed behavioral targeting system comprising:

retrieving the existing source data and the existing result data;

inputting the source data into the proposed behavioral targeting system, calculating proposed predicted result data using the proposed behavioral targeting system, and comparing the proposed predicted result data to the existing result data to calculate the second performance metric value;

determining, by the processor, a value of said new source data by comparing said second performance metric value to said baseline performance metric value, the determination indicating whether the new source data improved the predicted result data of the proposed behavioral targeting system in comparison with the predicted result data of the baseline behavioral targeting system;

when said second performance metric value is greater than said baseline performance metric value, using said new source data to select a first new advertisement for display;

when said baseline performance metric value is greater than said second performance metric value, using said existing source data to select a second new advertisement for display;

displaying, by the processor, the selected advertisements on the at least one webpage.

13. The method as set forth in claim 12 wherein determining a value of said new source data comprises calculating a percentage increase of said second performance metric value over said baseline performance metric value.

14. The method as set forth in claim 12 wherein determining a value of said new source data comprises calculating a difference between said second performance metric value and said baseline performance metric value.

15. The method as set forth in claim 13 wherein determining a value of said new source data further comprises multiplying said percentage increase of said second performance metric value over said baseline performance metric value by a monetary value of said baseline behavioral targeting system.

16. The method as set forth in claim 12 wherein performance metric values further comprises an amount of time that the user has spent on an advertiser web site after interacting with the advertisement selections.

* * * * *